US006928060B1

(12) United States Patent
Kikuchi

(10) Patent No.: US 6,928,060 B1
(45) Date of Patent: Aug. 9, 2005

(54) AUDIO DATA COMMUNICATION

(75) Inventor: Takeshi Kikuchi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/272,911

(22) Filed: Mar. 19, 1999

(30) Foreign Application Priority Data

Mar. 27, 1998 (JP) .......................................... 10-081324

(51) Int. Cl.⁷ ................................................ H04J 3/16
(52) U.S. Cl. ........................ 370/265; 370/467; 370/538; 375/225; 713/400; 713/500; 713/600
(58) Field of Search .................................. 370/265, 465, 370/466, 467, 503, 516, 538; 375/225; 713/400, 500, 600

(56) References Cited

U.S. PATENT DOCUMENTS

| | | | | |
|---|---|---|---|---|
| 4,745,621 A | * | 5/1988 | Sawaya et al. | ............. 375/225 |
| 5,523,525 A | * | 6/1996 | Murakami et al. | ............ 84/602 |
| 5,734,119 A | | 3/1998 | France | |
| 5,790,745 A | * | 8/1998 | Sugiyama et al. | .......... 386/111 |
| 5,835,138 A | * | 11/1998 | Kondo | .................. 348/207.99 |
| 5,974,015 A | * | 10/1999 | Iizuka et al. | .................. 369/60 |
| 6,088,364 A | * | 7/2000 | Tokuhiro | ..................... 370/466 |
| 6,137,825 A | * | 10/2000 | Sekine et al. | ................ 375/130 |
| 6,317,440 B1 | * | 11/2001 | Sung | ........................... 370/505 |

FOREIGN PATENT DOCUMENTS

| | | |
|---|---|---|
| JP | 60144037 | 7/1985 |
| JP | 61198941 | 9/1986 |
| JP | 63-178634 | 7/1988 |
| JP | 63245031 | 10/1988 |
| JP | 64-16040 | 1/1989 |
| JP | 04144437 | 5/1992 |
| JP | 06261017 | 9/1994 |
| JP | HEI 08-340314 | 12/1996 |

* cited by examiner

*Primary Examiner*—Steven Nguyen
*Assistant Examiner*—Roberta A Stevens
(74) *Attorney, Agent, or Firm*—Morrison & Foerster LLP

(57) ABSTRACT

A communication device which comprises transfer rate estimation means for estimating transfer rate of media data other than digital audio data before transmission, data amount controlling means for controlling data amount of the digital audio data to be transmitted in accordance with the transfer rate estimated by said transfer rate estimation means, and transmission means for transmitting the audio data whose data amount is controlled by said data amount controlling means and the media data other than the audio data.

11 Claims, 13 Drawing Sheets

AUDIO DATA COMMUNICATION

This application is based on Japanese patent application No. 10-81324 filed on Mar. 27, 1998, the entire contents of which are incorporated herein by reference.

BACKGROUND OF THE INVENTION a) Field of the Invention

The present invention relates to a technique for audio data communications, more particularly to a technique for data communications which enables communications of high sound quality audio data.

b) Description of the Related Art

There is a standard for communication among electronic musical instruments called Musical Instrument Digital Interface (MIDI). An electronic musical instrument having a MIDI interface can be connected to other electronic musical instruments via MIDI cables. This connection enables the instruments to communicate MIDI data from each other via the MIDI cables. For example, a player plays a musical piece with one electronic musical instrument and the instrument transmits MIDI data representing the played musical piece to another electronic musical instrument, and the instrument which receives the MIDI data can reproduce the musical piece. That is, connected electronic musical instruments can simultaneously reproduce a musical piece which is played by a player with another instrument.

A communication network connecting a plurality of general purpose computers enables the connected computers to communicate various information with each other. For example, a computer stores information like audio data (representing notes produced by non-electronic musical instruments), MIDI data, or the like in its hard disk drive or the like and transmits the information to other computers via the communication network. The computer which receives the information can store the received information in its storage device such as a hard disk drive. An object of such a general purpose computer communication network is to be a medium for communicating information among computers, however, its property differs from that of the MIDI network which enables the electronic musical instruments to communicate with each other in real time.

The MIDI standard realizes real time communication among the electronic musical instruments, however, it is not suitable for long distance communication and communication among multiple nodes. On the contrary, the general purpose computer network is suitable for the long distance communication and communication among multiple nodes, however, it is not designed for the real time communication among the electronic musical instruments.

The general purpose computer network has been used for multimedia data communications. A case of communicating audio data and other media data (for example, MIDI data) will now be described.

FIG. 2 is a graph showing relationship between communication rate (transfer rate) and a lapse of time between audio data AD and other media data OD. In the graph, the horizontal axis indicates the lapse of time and the vertical axis indicates the transfer rate represented by bit per second (BPS).

The audio data AD is digital data sampled with predetermined sampling frequency. The sound quality of the audio data AD is stable because the audio data AD is sampled with a constant sampling frequency. Therefore, the transfer rate of the audio data AD is also constant as time lapses in principle.

The audio data is often compressed before transmission. In such a case, the transfer rate is not always constant because compression rate may be uneven.

However, such unevenness of the transfer rate is very slight. Regardless of the compression, the audio data is sampled in accordance with a constant sampling frequency per a predetermined period of time, therefore, its sound quality is stable.

The media data OD includes on or a plurality of media data pieces other than the audio data AD, such as MIDI data and/or image data. The MIDI data includes commands such as note-on command indicating a note to be sounded and note-off command indicating a note to be muted. In a case of an electronic keyboard instrument, the note-on command is generated in response to a key-on action and the note-off command is generated in response to a key-off action. The transfer rate of the MIDI data often varies.

Accordingly, the transfer rate of the audio data AD is constant while that of the other media data OD is variable. As for the media data OD, a range of its transfer rate is 0 to B1, for example. B1 represents maximum transfer rate of the media data OD, that is, the total transfer rates of the MIDI data and the image data, for example.

Maximum amount (band width) of data per a predetermined period of time is limited. The total transfer rates of the audio data AD and the other media data OD must not exceed a transfer rate limit B0. Each transfer rate is determined as follows.

Transfer rate B2 of the audio data AD is obtained by the following equation:

$$B2 = B0 - B1$$

where B1 represents a maximum transfer rate of the media data OD other than the audio data AD, that is, a peak value in the transfer rate variation, and B0 represents the transfer rate limit.

Each transfer rate is required to be set so that the sum of the transfer rate B2 of the audio data AD and the maximum transfer rate B1 of the other media data OD does not exceed the transfer rate limit B0.

The transfer rate B2 of the audio data AD seldom varies even if the transfer rate of the media data OD varies as time lapses. Since the transfer rate of the media data OD often varies, the total transfer rate of the audio data AD and the media data OD also varies as time lapses. The network occupation rate is sometimes low and sometimes not in accordance with the transfer rate variation. That is, excellent transfer efficiency is not always available.

SUMMARY OF THE INVENTION

It is an object of the present invention to provide a communication technique which realizes audio data communication with excellent efficiency.

According to one aspect of the present invention, there is provided a communication device which comprises:

transfer rate estimation means for estimating transfer rate of media data other than digital audio data before transmission;

data amount controlling means for controlling data amount of the digital audio data to be transmitted in accordance with the transfer rate estimated by said transfer rate estimation means; and transmission means for transmitting the audio data whose data amount is controlled by said data amount controlling means and the media data other than the audio data.

The transfer rate of the media data other than the audio data may varies as time lapses. The sound quality of the audio data can be improved by controlling the amount of the audio data to be transmitted in accordance with the transfer rate of the media data. That is, the amount of the audio data is reduced when the transfer rate of the other media data is high, and the amount of audio data is increased when the transfer rate of the other media data is low. Thus, the average sound quality of the audio data is improved.

Since the amount of the audio data is controlled in accordance with the transfer rate of the other media data, improved transfer efficiency is available.

DESCRIPTION OF THE PREFERRED EMBODIMENT

Figure 1:
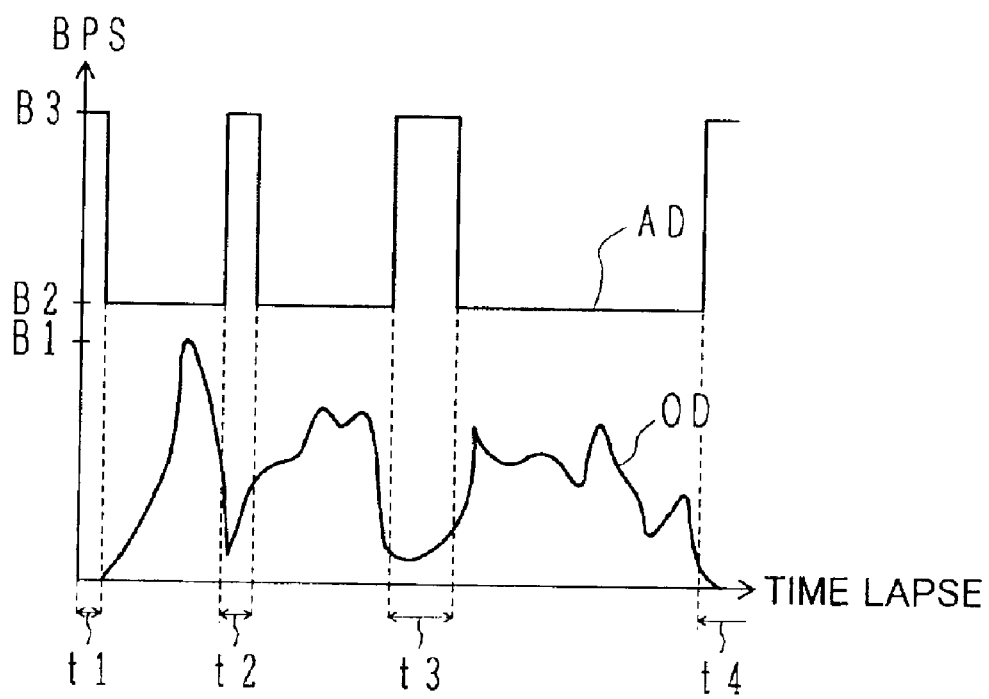
FIG. 1 is a graph showing a relationship between transfer rate and a time lapse regarding to audio data and other media data according to an embodiment of the present invention.
Figure 2:
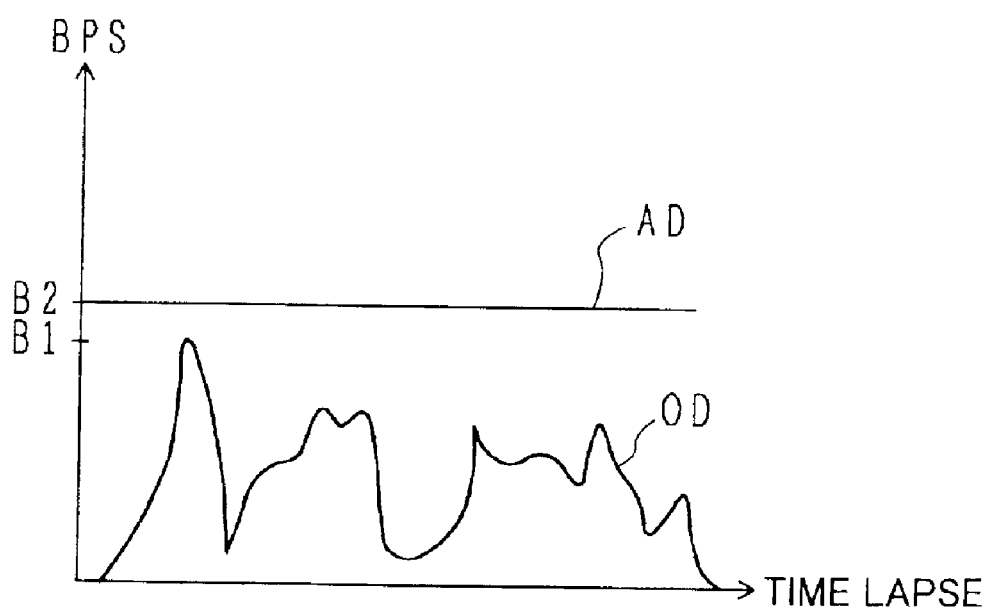
FIG. 2 is a graph showing a relationship between transfer rate and a time lapse regarding to the audio data and the other media data.

FIG. 1 is a graph showing a relationship between transfer rate (communication rate) and a lapse of time regarding to audio data AD and other media data OD. In the graph, the horizontal axis indicates the lapse of time and the vertical axis indicates the transfer rate represented by bit per second (BPS).

A multimedia communications technology enables parallel transmission of the audio data AD and the other media data OD.

The media data OD includes one or a plurality of media data segments other than the audio data AD, such as MIDI data and/or image data, for example. The MIDI data includes commands such as note-on command indicating a note to be sounded and note-off command indicating a note to be muted. The transfer rate of the MIDI data often varies.

If the transfer rate of the audio data AD is constant as time lapses, the total transfer rate of the audio data AD and the other media data OD may varies as time lapses. That is, excellent transfer efficiency (network occupation rate) is not always available.

To obtain excellent transfer efficiency, the transfer rate of the audio data AD is controlled in accordance with the transfer rate of the other media data OD. That is, the transfer rate of the audio data AD is gained to high transfer rate indicated by B3 during periods t1, t2, t3 and t4 in which the transfer rate of the other media data OD is relatively low, while the transfer rate of the audio data AD is set to standard transfer rate indicated by B2 when the transfer rate of the other media data OD is relatively high.

Thus, the transfer rate of the audio data AD is controlled to be high while the transfer rate of the other media data OD is relatively low, and vice versa. As a result, available transfer efficiency is always excellent, moreover, the total transfer rate of the audio data AD and the other media data OD does not exceed the transfer rate limit B0.

The transfer rate of the audio data AD is controlled dynamically in accordance with the transfer rate variation in the other media data OD. The sound quality of the audio data AD is improved because the transfer rate of the audio data AD is controlled so as to be high when the transfer rate of the other media data OD is low.

The available transfer rate of the audio data is not limited to B2 and B3. The transfer rate of the audio data may be set to various values.

Figure 3:
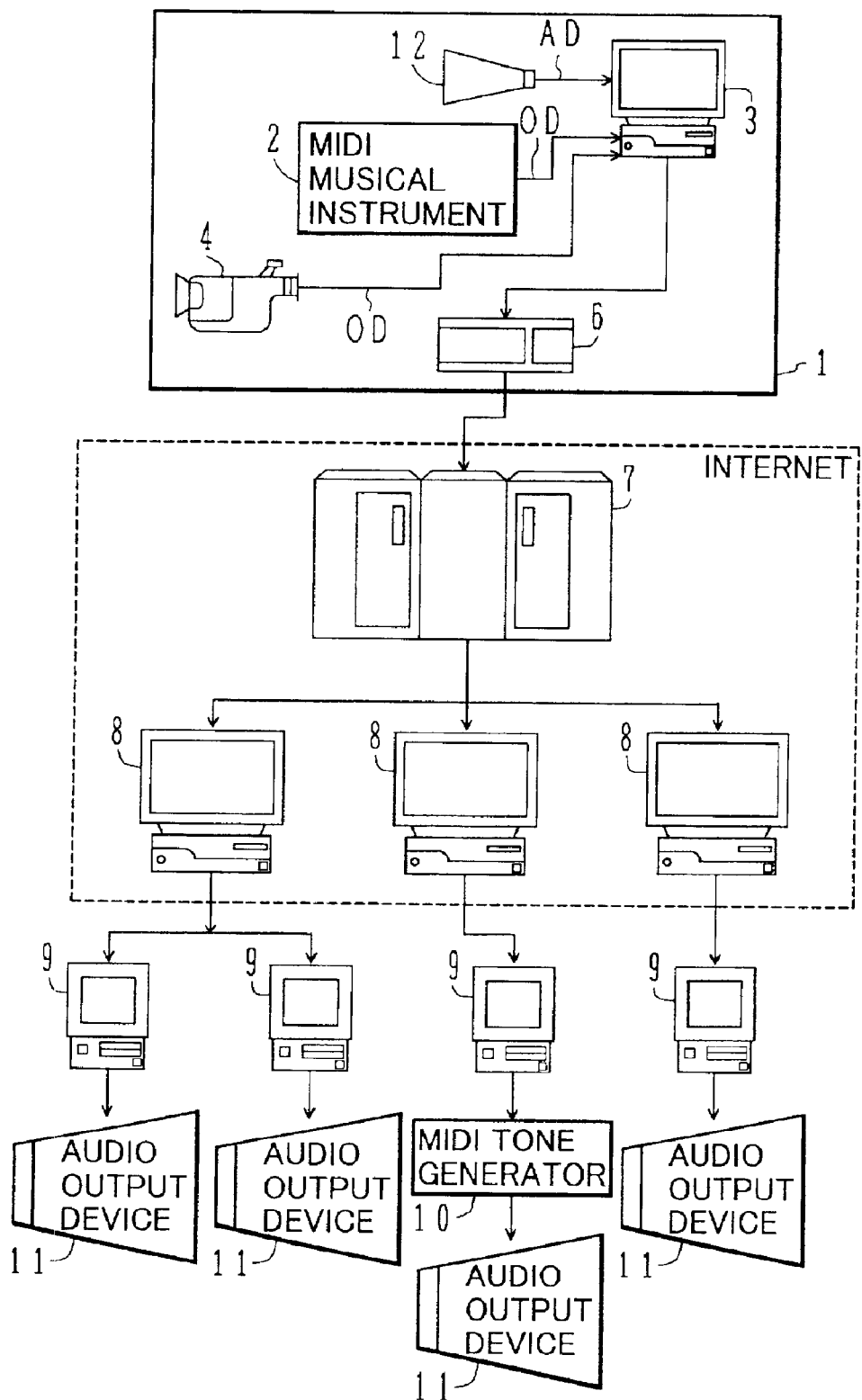
FIG. 3 is a schematic diagram showing a multimedia communications network.

FIG. 3 is a diagram showing a multimedia communication network.

Installed in a hall 1 are an audio input device 12, a MIDI musical instrument 2, a camera 4, an encoder 3, and a router 6. The audio input device 12 is, for example, a microphone. In the hall 1, a player plays a musical piece with the MIDI musical instrument 2 and a singer sings a song with the played musical piece toward the audio input device 12. Or, the audio input device 12 may be placed near the drums, the piano, and the guitar to input their sounds thereto. That is, the number of the audio input device 12 is not limited to 1.

The audio input device 12 generates an analog audio signal (speech signal) after converting the input singer's voice, drum sounds, or the like into an electric signal, and supplies the generated audio signal to the encoder 3 in real time. The encoder 3 converts the input analog audio signal into digital audio data (speech data). "AD" in FIG. 1 denotes such the audio data.

The MIDI musical instrument 2 generates MIDI data in accordance with the player's action for playing the musical piece and supplies the generated MIDI data to the encoder 3. The camera 4 captures the player's performance and supplies the captured picture as image data to the encoder 3. "OD" in FIG. 1 denotes media data other than the audio data, that is, the MIDI data and the image data.

The encoder 3 obtains data amount of the MIDI data and the image data per a predetermined time period, and controls the data amount (the number of the samples) per a predetermined time period of the audio data AD in accordance with the obtained data amount of the MIDI data and the image data. The encoder 3 controls the data amount of the audio data AD to be reduced when the data amount of the MIDI data and the image data is large, and to be gained when the data amount of the MIDI data and image data is small. This process will be described in detail with reference to FIG. 4.

The encoder 3 sends the input image data in predetermined data format to the internet via the router 6 in the form of packet transmission. The data format will be described with reference to FIGS. 8A and 8B.

The router 6 transmits the audio data, MIDI data and image data to a server 7 and other World Wide Web (WWW) servers 8 via the internet using a telephone line or a directly-connected line. The WWW server 8 is so called an internet service provider.

A user connects his/her home computer 9 to one of the WWW servers 8 for using the internet. The home computer 9 receives the audio data, the MIDI data and the image data through the internet. The home computer 9 comprises a display device and a MIDI tone generator (sound source). The MIDI tone generator is connected to an audio output device 11.

The display device displays thereon images represented by the received image data. The MIDI tone generator converts the received MIDI data into a tone signal. The audio output device 11 reproduces the tone signal and sounds the reproduced tones. The home computer 9 converts the received audio digital data into analog audio data, and the audio output device 11 reproduces the analog audio data and sounds the reproduced tones. The home computer 9 controls the MIDI data and the audio data so as to be synchronized with each other, and are reproduced by the audio output device 11. Accordingly, the sounds or voices produced in the hall 1 are reproduced by the audio output device 11 in real time.

Even in case of the MIDI tone generator 10 being not installed in the home computer 9, the home computer can control the externally connected MIDI tone generator 10 to generate a tone signal and control the audio output device 11 connected to the external MIDI tone generator 10 to reproduce the generated tone signal and sound the reproduced tones.

Since a user who prefers reproducing musical performance with his/her home computer 9 lays emphasis on the MIDI and audio data playback rather than the image data reproduction, the MIDI data and the audio data are processed prior to the image data. Such a user does not stick to the quality of the reproduced image even if it is rough and the number of frames is poor, however, requires high quality sounds reproduced from the MIDI data and the audio data. On the contrary, in a case where a user prefers watching live sports, he/she lays emphasis on the image data reproduction rather than the MIDI and audio data playback The user being away from the hall 1 can see the live performance and listen the sounds and/or voices produced in the hall 1 through the display device in real time while staying at home. Moreover, anyone who can connect his/her home computer 9 to the internet can listen to the sounds and/or voices produced in a remote place. For example, an unspecified number of people staying at home can enjoy a concert performed in the hall 1 without going to the concert hall.

It seems like the player in the remote hall plays an electronic musical device in each users house, because the MIDI data in accordance with the player's performance in the hall controls the sound source installed in the house. Moreover, the MIDI data is not influenced by any noise.

Figure 4:
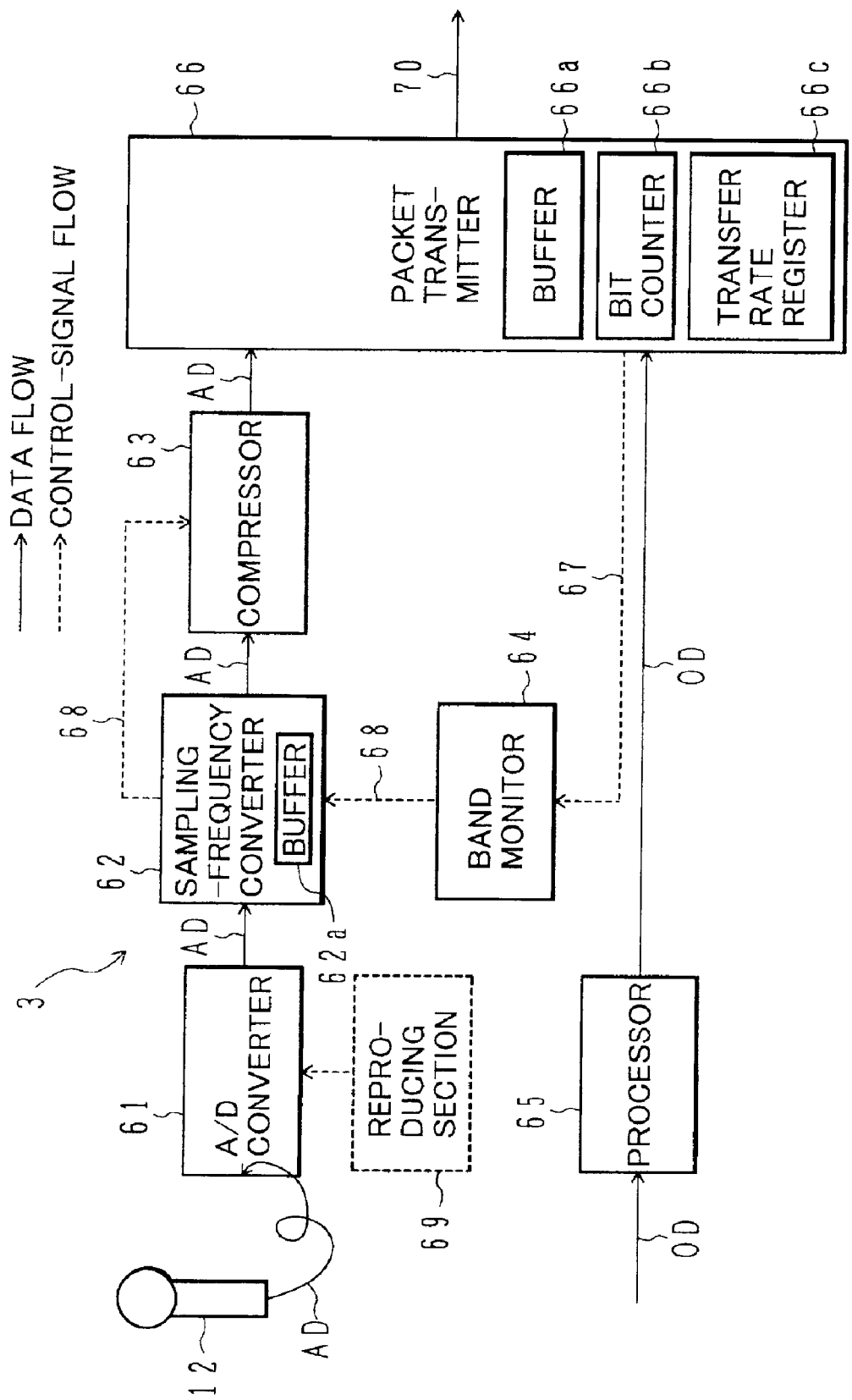
FIG. 4 is a block diagram showing function of an encoder as a transmission terminal.

FIG. 4 is a block diagram showing function of the encoder 3 as the transmission terminal. In the diagram, solid line arrows indicate data flow of the audio data AD or the other media data OD, and broken line arrows indicate signal flow of a control signal.

A processor 65 receives the media data OD, including the MIDI data and the image data other than the audio data AD, from the MIDI musical instrument and the camera, and executes data compressing and the like.

A packet transmitter 66 comprises a buffer 66a, a bit counter 66b, and a transfer rate register 66c. The buffer 66a receives the media data other than the audio data from the processor 65 and stores it. The bit counter 66b counts bits of the media data other than the audio data stored in the buffer 66a. The transfer rate register 66c stores a value of the counted bit per a predetermined time period (for example, 1 second). That is, the transfer rate register 66c stores data amount per a predetermined time period i.e. transfer rate of the media data other than the audio data.

A band monitor 64 determines a sampling frequency and compression mode of the audio data in accordance with the transfer rate value 67 stored in the transfer rate register 66c. A sampling-frequency converter 62 is informed by the band monitor 64 of the determined sampling frequency and the compression mode 68.

Figure 6:
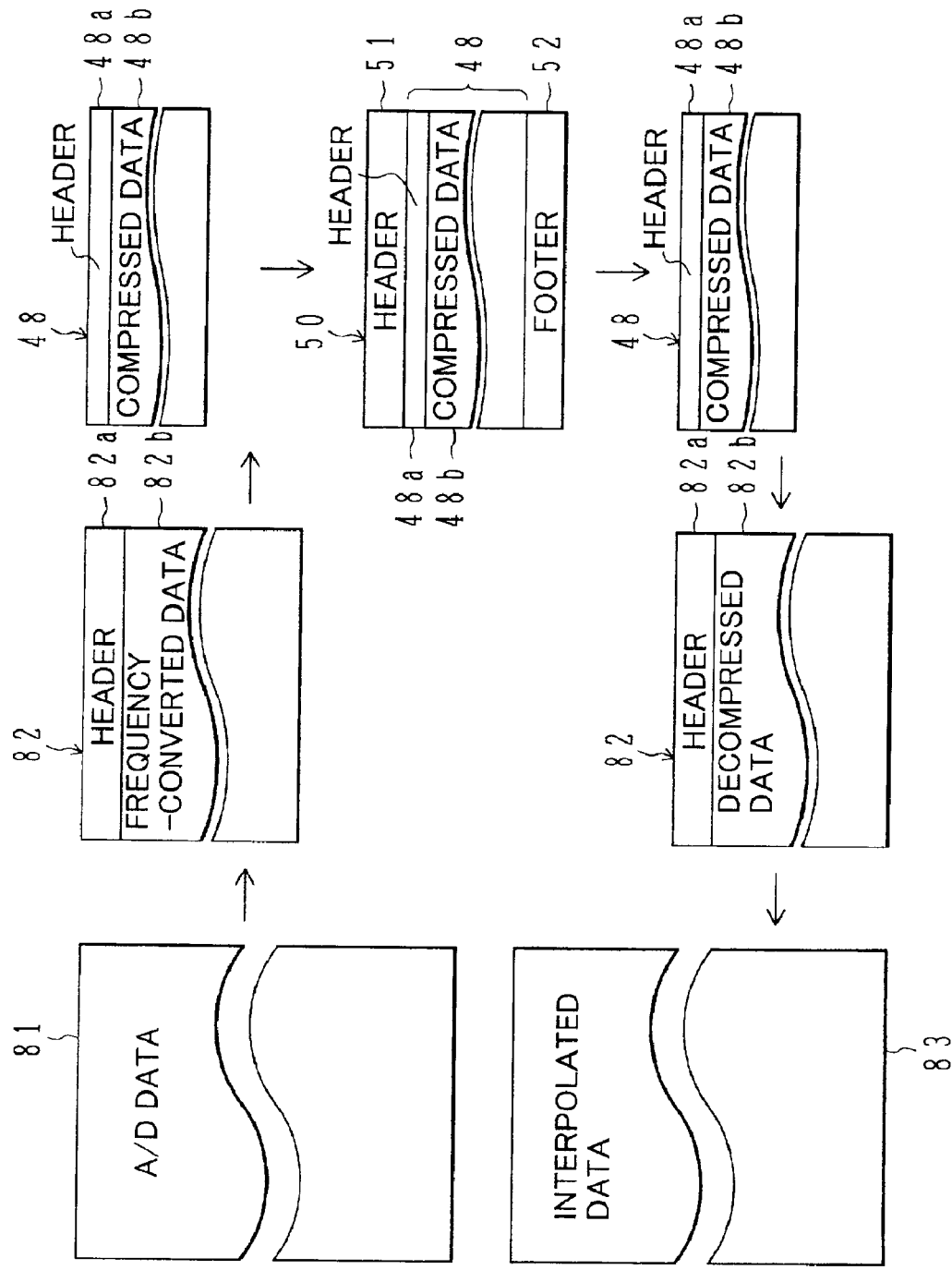
FIG. 6 is a time chart showing audio data variation.

The audio input device (for example, a microphone) 12 converts voices and sounds into an analog electric signal (audio signal). An A/D converter 61 includes a buffer and converts the analog audio signal into digital audio data 81 (FIG. 6). The data amount of the digital audio data 81 depends on the buffer capacity or a predetermined period of time required for buffering.

The sampling-frequency converter 62 receives the digital audio data from the A/D converter 61 and stores it in a buffer 62a, and converts the audio data stored in the buffer 62a into audio data 82b having a sampling frequency 68 (FIG. 6). The sampling frequency 68 is based on the instruction from the band monitor 64. As shown in FIG. 6, data 82 is generated after a header 82a indicating the sampling frequency and the compression mode is given to the audio data 82b.

For example, the A/D converter 61 performs A/D conversion in accordance with the available highest sampling frequency (for example, 50 kHz). The sampling-frequency converter 62 can reduce the sampling frequency by thinning out the audio data.

The sampling-frequency converter 62 informs a compressor 63 of the sampling frequency and the compression mode 68 determined by the band monitor 64. The compression mode 68 indicates the employed compression format.

The compressor 63 receives the audio data AD from the sampling-frequency converter 62 and compress it in accordance with the informed sampling frequency and the compression mode 68. Thus, compressed data 48 (FIG. 6) is generated. As shown in FIG. 6, the compressed data 48 includes a header 48a and audio data 48b. The header 48a indicates the sampling frequency and the compression mode of the data.

As shown in FIG. 6, the packet transmitter 66 generates a packet 50 after giving a header 51 and a footer 52 to the compressed data 48 and transmit the generated packets to the internet. The packet transmitter 66 also generates packets of the media data OD other than the audio data AD stored in the buffer 66a and transmits those packets 70.

Before transmitting the audio data AD, its sampling frequency is determined in accordance with a transfer rate of the other media data OD at that time. Then the audio data AD is divided into packets after subjected to frequency conversion and compression. During those steps, the buffer 66a holds the other media data OD. The audio data AD and the other media data OD are transmitted immediately after packets for the other media data OD are generated. Thus, the transfer rate of the other media data OD is obtained accurately when transmitting the audio data AD.

In a case where the transfer rate of the other media data OD does not vary rapidly as time lapses, the other media data OD may be transmitted before the frequency conversion for the audio data is completed. In this case, the sampling frequency of the audio data is determined based on a supposed current transfer rate of the other media data OD. In this case, it is supposed that the current transfer rate is almost the same as that in the past. In other words, the current transfer rate is estimated based on the past transfer rate. In this case, the media data other than the audio data is transmitted before the audio data is divided into packets.

Figure 7:
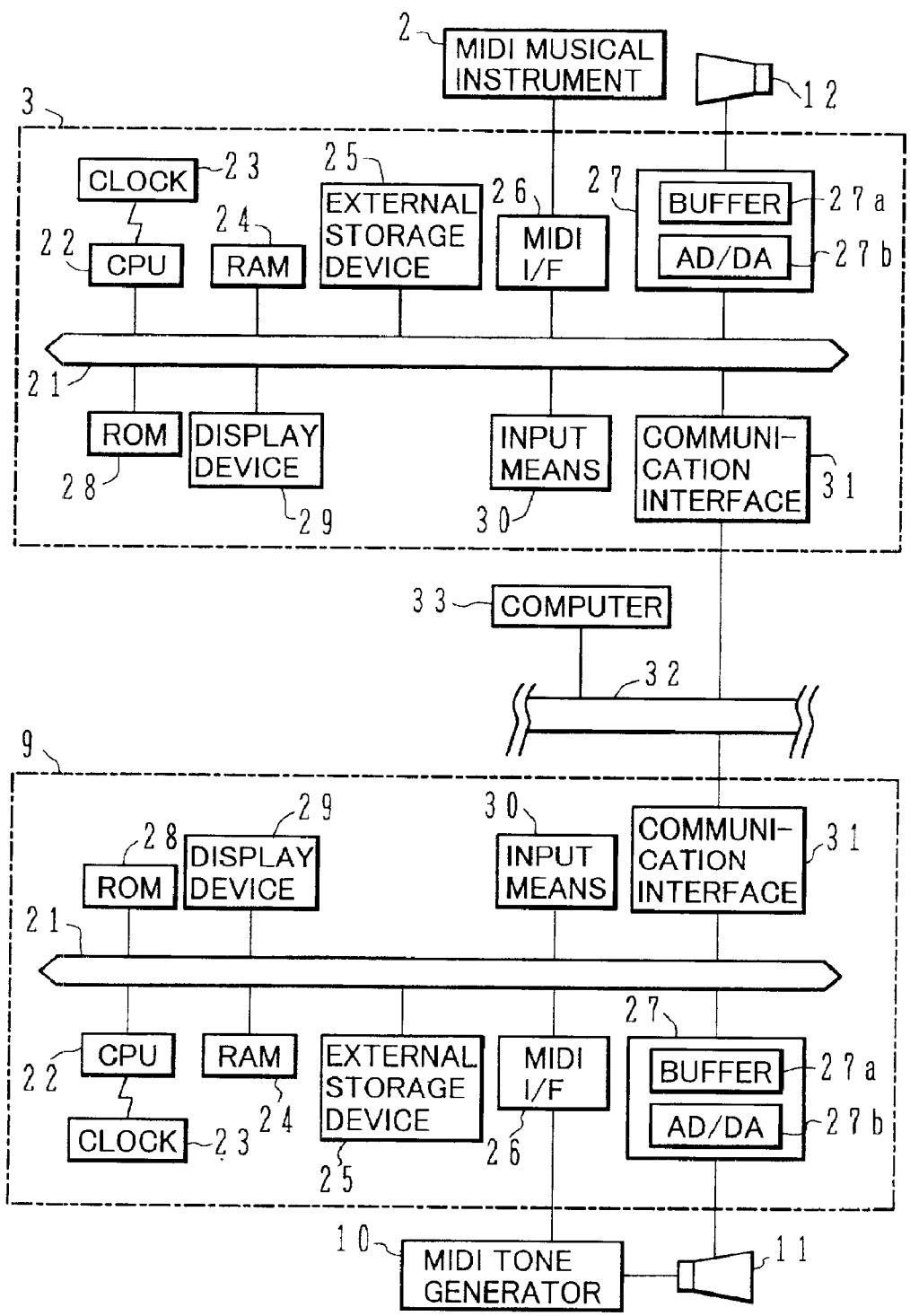
FIG. 7 is a block diagram showing the hardware structures of the encoder and the home computer.

The sampling-frequency converter 62 receives the audio data from the A/D converter 61 in this embodiment, however, it may receive reproduced digital audio data from an audio reproducing section 69, or may receive digital audio data to be reproduced stored in a storage section (for example, the external storage device 25 shown in FIG. 7).

Figure 5:
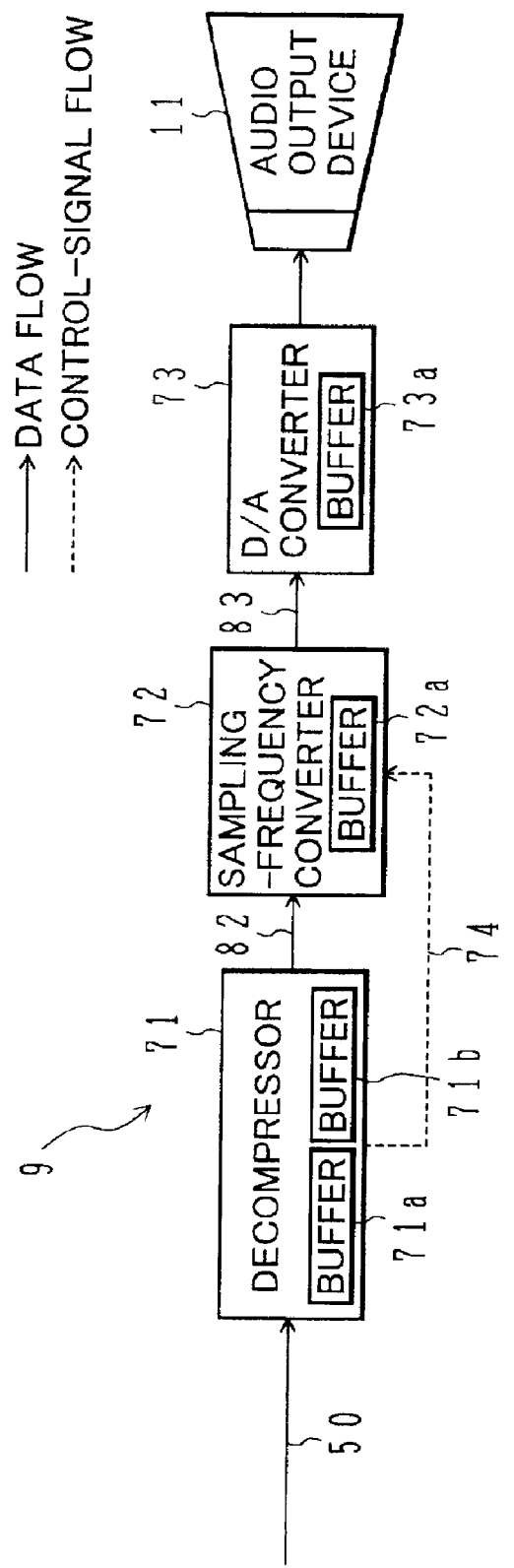
FIG. 5 is a block diagram showing function of a home computer as a reception terminal.

FIG. 5 is a block diagram showing function of the home computer 9 (FIG. 3) as a reception terminal. Solid line arrows indicate data flow of the audio data, and broken line arrows indicate signal flow of a control signal.

A case where the home computer 9 receives the audio data will now be described.

As shown in FIG. 6, a decompressor 71 receives the audio data packet 50. A reception buffer 71a stores essential data except the header and footer in the packet 50, that is, the compressed data 48. The decompressor 71 decompresses the compressed data 48 and an output buffer 71b stores decompressed data 82. The decompressed data 82 includes its header 82a and audio data 82b. The decompression is carried out in accordance with the sampling frequency and the compression mode indicated by the header 82a. The decompressed data 82 is transferred to the buffer 72a of the sampling-frequency converter 71 from the buffer 71b. The decompressor 71 supplies sampling frequency information 74 to the sampling-frequency converter 72.

The sampling-frequency converter 72 generates audio data 83 by converting the sampling frequency of the audio data 82b in the buffer 72a in accordance with the sampling frequency information 74. The sampling frequency conversion will be described later. The generated audio data 83 is stored in a buffer 73a of a D/A converter 73. After the sampling frequency conversion is carried out by the sampling-frequency converter 72, the sampling frequency values which are different each other packet by packet are equalized.

For example, the sampling-frequency converter 72 restores the sampling frequencies of all data packets to original sampling frequencies, that is, the sampling frequencies of the data before converted by the A/D converter 61. In this case, the sampling-frequency converter 72 interpolates the audio data 82b. As a result, the sampling frequencies of the resultant audio data 83 is the same as the pre-transmitted audio data 81.

The D/A converter 73 converts the digital audio data 83 in the buffer 73 into an analog audio signal. The audio output device 11 reproduces the analog audio signal.

FIG. 7 is a block diagram showing more detailed hardware components of the encoder 3 and the home computer 9. General purpose computers or personal computers may be used as the encoder 3 and the home computer 9.

The encoder 3 and the home computer 9 have the similar structures. Common components in the encoder 3 and the home computer 9 will now be described. Each bus 21 connects a CPU 22, a RAM 24, an external storage device 25, a MIDI interface 26 for communicating MIDI data with a connected external device, a sound board 27, a ROM 28, a display device 29, an input means 30 such as a keyboard, switches, a mouse, or the like, and a communication interface 31 for communication through the internet.

The sound board (card) 27 comprises a buffer 27a and a coder-decoder (CODEC) circuit 27b. The buffer 27a buffers input audio data or audio data to be output. The CODEC circuit 27b comprises an A/D converter and a D/A converter, thus intermediates between digital data and analog data. The CODEC circuit 27b further comprises a compressing/decompressing circuit, thus is able to compress or decompress data. The compressing circuit compresses the audio data before transmitting it to the internet.

The external storage device 25 is, for example, a hard disk drive, a floppy disk drive, a compact disc read-only memory (CD-ROM) drive, a magneto-optical disk drive, or the like, and stores data pieces such as MIDI data, audio data, image data and/or computer programs.

The ROM 28 stores computer programs and various parameters. The RAM 24 has working areas such as a buffer area and a register area, and imports data from the external storage device 25 and stores therein the imported data.

The CPU 22 executes calculations and processing in accordance with the computer programs stored in the ROM 28 or the RAM 24. The CPU 22 obtains time information from a system clock 23 and executes timer interruption.

The encoder 3 and the home computer 9 are connected to the internet 32 via their communication interfaces 31. The communication interface 31 is an interface for transmitting and receiving the MIDI data, the audio data and the image data through the internet. The encoder 3 and the home computer 9 are connected with each other via the internet 32.

The structure of the encoder 3 will now be described. The MIDI musical instrument 2 is connected to the MIDI interface 26 and the audio input device 12 is connected to the sound board 27. The MIDI musical instrument 2 generates MIDI data in accordance with musical performance by a player and sends the generated MIDI data to the MIDI interface 26. The audio input device 12 converts sounds in the hall into an analog audio signal, and outputs the analog audio signal to the sound board 27. In the sound board 27, the CODEC circuit 27b converts the analog audio signal into digital audio data. The digital audio data is compressed by the compressing/decompressing circuit.

The structure of the home computer 9 will now be described. The MIDI tone generator 10 is connected to the MIDI interface 26. The MIDI tone generator 10 and the audio output device 11 are connected to the sound board 27. The CPU 22 receives the MIDI data, the audio data and the image data from the internet 32 via the communication interface 31.

The communication interface 31 is not limited to the internet interface but may be an Ethernet interface, an IEEE1394 digital communication interface or an RS-232C interface which enables the encoder 3 and the home computer 9 to connect to various networks.

The encoder 3 stores therein computer programs for executing sampling frequency conversion of the audio data, audio data transmission, and the like. The home computer 9 stores therein computer programs for audio data reception, and the like. If the programs, parameters, and the like are stored in the external storage device 25 and those are read out to the RAM 24 for processing, easy update or addition of the computer programs and the like is realized.

The CD-ROM drive is a device for reading out computer programs or the like from a CD-ROM. The read computer programs or the like are stored in the hard disk drive. Thus, installing or updating the computer programs can be done easily.

The communication interface 31 is connected to a computer 33 via the communication network 32 such as a local area network (LAN), the internet, telephone lines, or the like. Even if the computer programs are not stored in the external storage device 25, those programs are available by downloading from the computer 33. In this case, the encoder 3 or the home computer 9 sends a request command to the computer 33 via the communication interface 31 and the communication network 32. In response to the request command, the computer 33 sends the required computer programs to the encoder 3 or the home computer 9 via the communication network 32. The encoder 3 or the home computer 9 receives the computer programs via the communication interface 31 and stores the received computer programs in the external storage device 25.

This system may consist of a personal computer in which the computer programs described in the embodiment are pre-installed. In this case, the computer programs may be distributed to a user with a computer readable recording medium such as a CD-ROM or a floppy disk. If the personal computer is connected to the communication network such as LAN, internet, or telephone line, the computer program or data may be distributed to the user via the communication network.

The encoder 3 or the home computer 9 is not limited to a personal computer but may be an electronic musical instrument, a video game device, a Karaoke apparatus, a television, or the like.

Figure 8A:
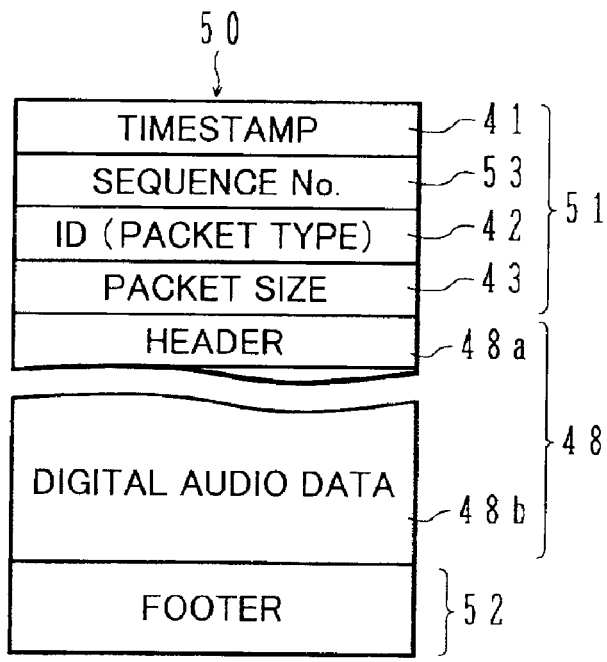
FIG. 8A is a schematic diagram showing the data structure of an audio data packet.

FIG. 8A shows the data structure of an audio data packet 50 transmitted by the encoder 3.

The audio data packet 50 includes a header 51, audio data 48, and a footer 52. The header 51 comprises timestamps 41 indicating time information, sequence number 53 indicating packet order, an identification code (ID) 42 indicating that this packet includes the audio data, and packet size 43.

The timestamps 41 represent time information including not only time when the audio data 48 in the packet is transmitted, but also time when the performance starts, time when the recording starts, and time when the reproduction starts. The encoder 3 generates the timestamps 41 in accordance with time information generated by its own system clock.

The identification code 42 represents the packet type such as an audio data packet, a MIDI data packet, and an image data packet. Since a case of transmitting the audio data 48 will be described in this embodiment, the identification code 42 represents the audio data packet.

The audio data 48 includes a header 48a indicating the sampling frequency and the compression mode, and audio data 48b. The audio data 48b is compressed digital data, that is, the data generated by the audio input device 12 (FIG. 3) is converted into digital data and is compressed after sampling frequency conversion.

The footer 52 indicates data end. The header 51 or the footer 52 may have check sum function. The check sum indicates, for example, the sum of the audio data 48. In this case, the encoder 3 calculates the sum of the MIDI data 44 and add it to the packet as the check sum. The home computer 9 calculates the sum of the received MIDI data 44 and compares the calculated sum and the check sum in the packet. If the calculated sum coincides with the check sum, the home computer 9 recognizes that the data is received successfully without any communication errors.

Figure 8B:
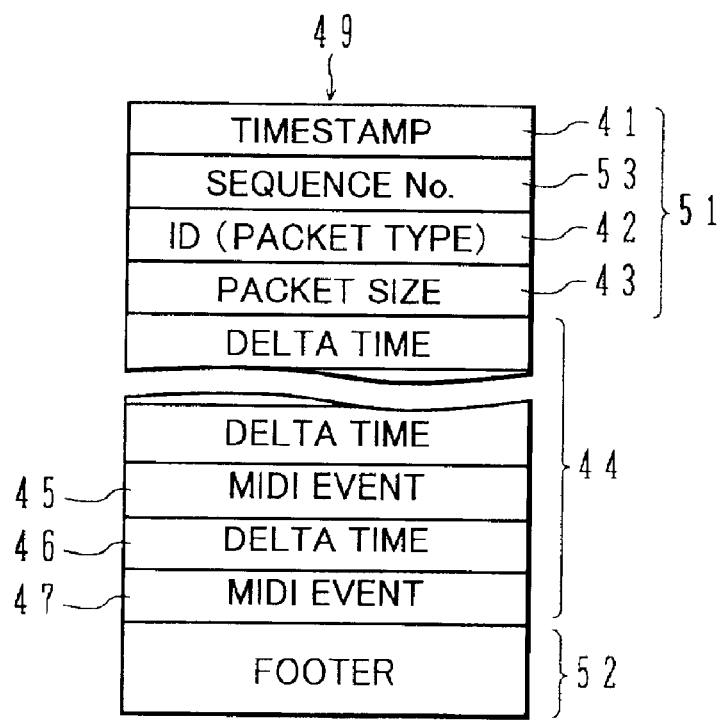
FIG. 8B is a schematic diagram showing the data structure of a MIDI data packet.

FIG. 8B shows the data structure of a MIDI data packet 49 transmitted by the encoder 3.

The MIDI data packet 49 comprises a header 51, MIDI data 44, and a footer 52.

Similar to the case of the audio data packet, the header 51 includes timestamps 41, sequence number 53, an identification code (ID) 42, and packet size 43.

The MIDI data 44 is prepared in the Standard MIDI file format so as to consist of data strings including combinations of a MIDI event and delta time (interval) 46. The delta time 46 indicates time interval between the former MIDI event 45 and following MIDI event 47. If there is no time interval, the delta time indication may be omitted.

The structure of the image data packet is similar to that of the audio data packet 50. The identification code 42 in the image data packet indicates that the packet includes the image data.

FIGS. 9 to 13 are flowcharts showing process sequence executed by the encoder 3.

Figure 9:
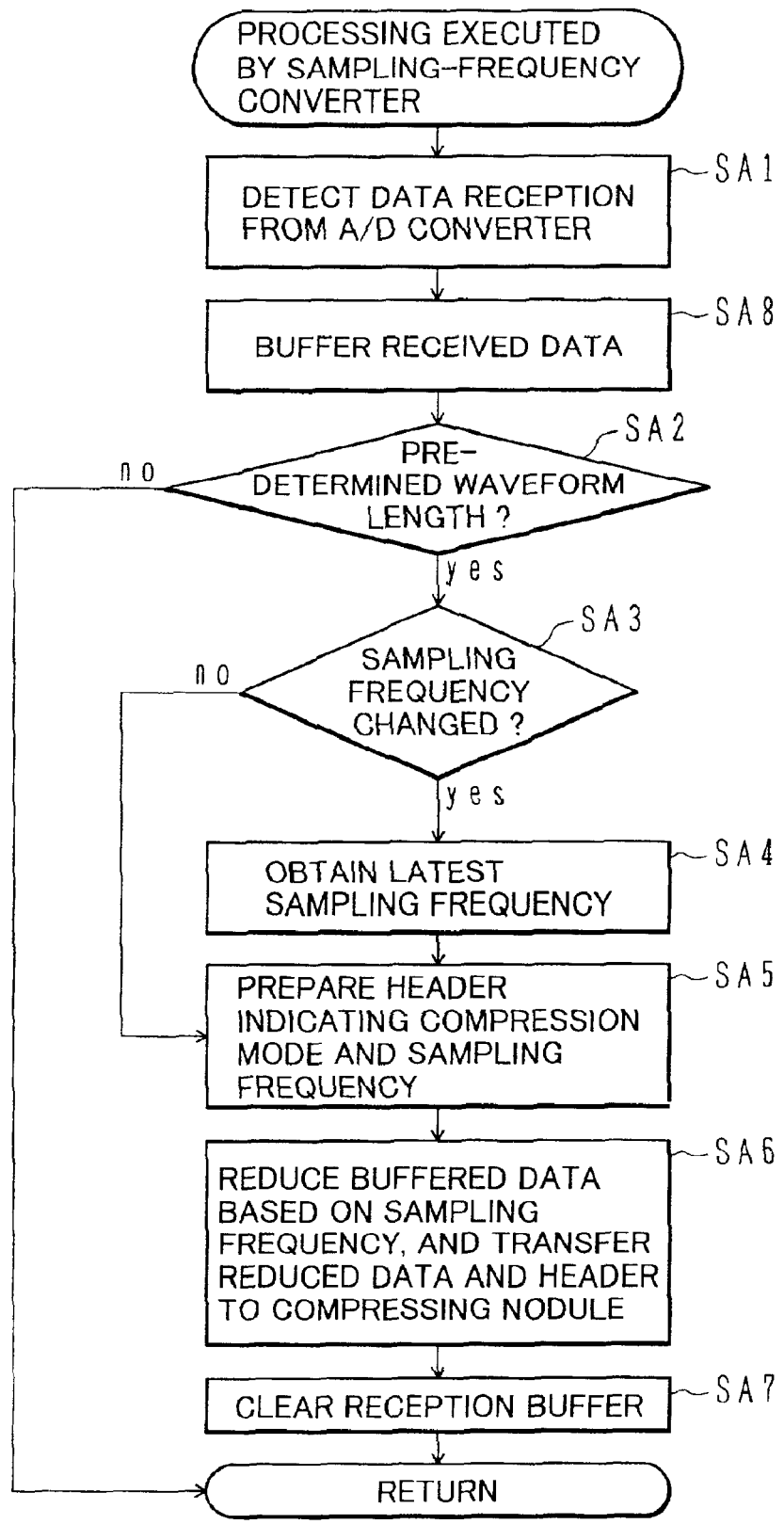
FIG. 9 is a flowchart showing process sequence executed by a sampling-frequency converter in the encoder.

FIG. 9 is a flowchart showing process sequence executed by the samplingfrequency converter 62 (FIG. 4) in the encoder.

In step SA1, the sampling-frequency converter 62 detects data from the A/D converter 61 (FIG. 4). The sampling-frequency converter 62 executes the following process sequence after data reception.

In step SA8, the reception buffer 62a stores therein digital audio data received from the A/D converter 61. In the initial state, the reception buffer 62a has no data (i.e. empty).

In step SA2, the sampling-frequency converter 62 determines whether the amount of the data in the reception buffer 62a (FIG. 4) is predetermined data amount (predetermined waveform length) or not. If the amount of the data in the reception buffer 62a is not the predetermined data amount, the sampling-frequency converter 62 completes this processing in accordance with the instruction indicating "no".

If the predetermined amount of data is stored in the reception buffer 62a, the flow goes to step SA3. The determination in step SA2 is based on whether the reception buffer 62a stores audio waveform having predetermined waveform length. The A/D converter 61 converts analog audio signal into the digital audio data in units of audio waveform for a predetermined period of time (for example, 1 second). It is preferable that the sampling-frequency converter 62 execute its processing in accordance with the unit of the audio waveform. It is further preferable that the data should be divided into packets in accordance with the unit before transmission.

In step SA3, the sampling-frequency converter 62 determines whether the sampling frequency has been changed or not. The band monitor 64 (FIG. 4) specifies the sampling frequency. In this step, the sampling-frequency converter 62 compares current sampling frequency and former sampling frequency. Therefore, the flow goes to step SA4 first time. And if there is difference between the current frequency and the former frequency, the flow goes to step SA4. If there is no difference, the flow goes to step SA5.

In step SA4, the sampling-frequency converter 62 obtains the latest sampling frequency, and then the flow goes to step SA5. If it is determined in step SA3 that the sampling frequency is unchanged, the flow goes to step SA5 without changing the sampling frequency and the compression mode. The compression mode indicates the employed compression format. It is determined together with the sampling frequency in accordance with the transfer rate of the other audio data.

In step SA5, the sampling-frequency converter 62 prepares a header indicating the compression mode and the sampling frequency designated by the band monitor 64.

In step SA6, the sampling-frequency converter 62 reduces the audio data in the reception buffer 62a based on the given sampling frequency. The reduced data and the header are sent to a compressor (compressing module) 63a. If the designated sampling frequency is the same as the sampling frequency for conversion by the A/D converter 61, the sampling-frequency converter 62 does not reduce the audio data.

In step SA7, the sampling-frequency converter 62 clears the reception buffer 62a for next reception, and then the processing is completed.

Accordingly, the sampling frequency is converted based on the sampling frequency which is determined in a unit of audio waveform having predetermined waveform length stored in the reception buffer 62a.

Figure 10:
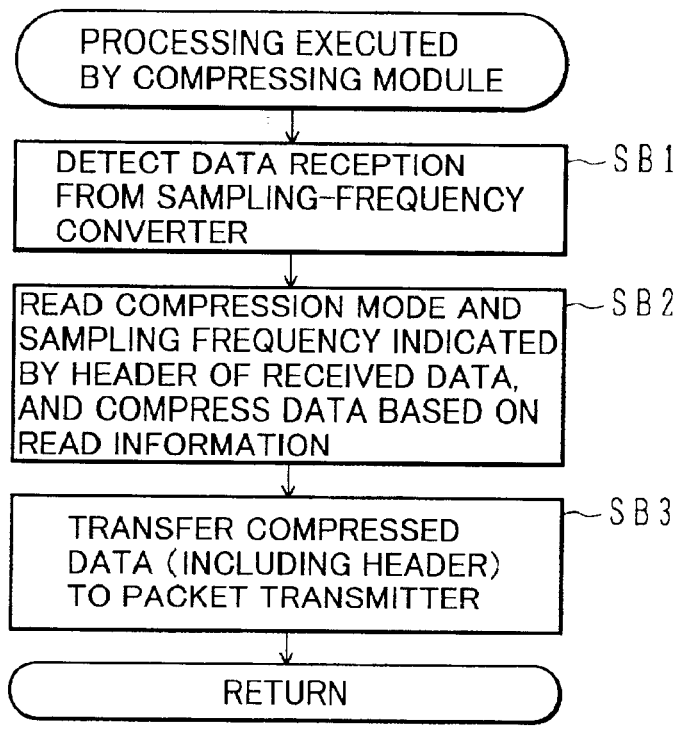
FIG. 10 is a flowchart showing process sequence executed by a compressor in the encoder.

FIG. 10 is a flowchart showing process sequence executed by the compressor (compressing module) 63 (FIG. 4).

In step SB1, the compressor 63 detects data from the sampling-frequency converter 62 (FIG. 4). The compressor 63 executes the following process sequence after data reception.

In step SB2, the compressor 63 reads the compression mode and the sampling frequency indicated by the header of the data received from the sampling-frequency converter 62, and compresses the received data in accordance with the compression mode and the sampling frequency.

In step SB3, the compressor 63 sends the compressed data (including the header) to the packet transmitter 66 (FIG. 4), and then the processing is completed.

Figure 11:
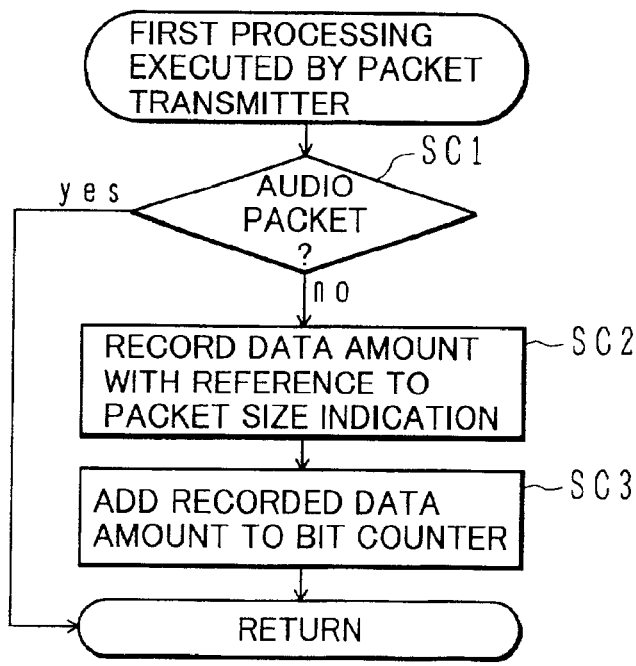
FIG. 11 is a flowchart showing first process sequence executed by a packet transmitter in the encoder.

FIG. 11 is a flowchart showing first process sequence executed by the packet transmitter 66 (FIG. 4) in the encoder.

In step SC1, the packet transmitter 66 divides the audio data or the other media data into packets shown in FIG. 8A or 8B. If the generated packet includes the audio data, the packet transmitter 66 transmits the packet, and then the processing is completed. If the generated packet includes the media data other than the audio data, the flow goes to step SC2. Determination whether the in-packet data is the audio data or the other data depends on the identification code 42 (FIGS. 8A, 8B).

In step SC2, the packet transmitter 66 records the amount of the media data other than the audio data with reference to the packet size 43 (FIG. 8B).

In step SC3, the packet transmitter 66 adds the recorded data amount to the value of the bit counter 66b (FIG. 4). An initial value of the bit counter 66b is 0. Then, the packet transmitter 66 transmits the packets including the media data concerned after a predetermined period of time has lapsed. The first process sequence of the packet transmitter is thus completed.

The above described first process sequence is executed repeatedly every time the packet transmitter receives the audio data or the other media data. Thus, the bit counter 66b cumulates the amount of media data other than the audio data.

Figure 12:
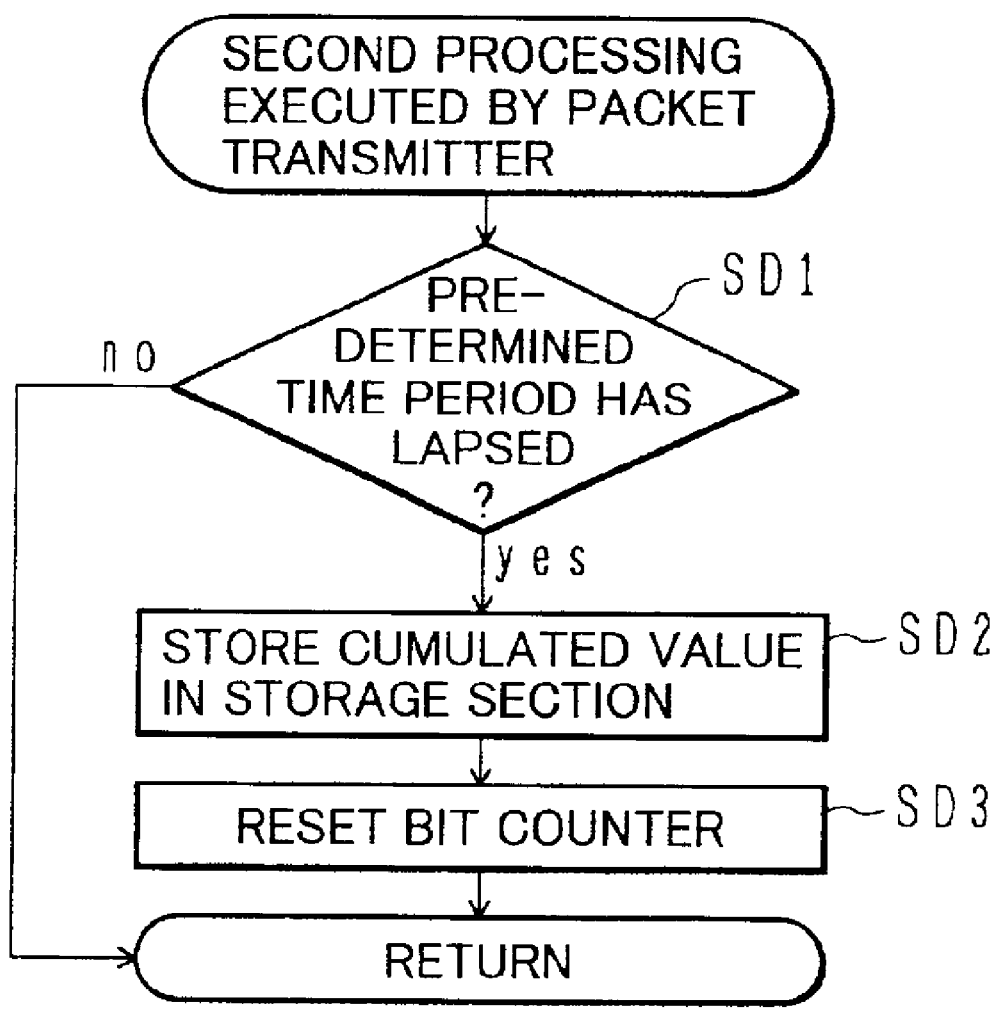
FIG. 12 is a flowchart showing second process sequence executed by the packet transmitter in the encoder.

FIG. 12 is a flowchart showing second process sequence executed by the packet transmitter 66 constantly at predetermined intervals.

In step SD1, the packet transmitter 66 determines whether a predetermined period of time has lapsed or not. At the beginning of this process sequence, the packet transmitter 66 determines whether the predetermined period of time has lapsed since an initial point (a point of transmission start). The predetermined period of time may be 1 second or 10 m second.

In step SD2, the transfer rate register 66c (FIG. 4) stores therein the cumulated value of the bit counter 66b. The bit counter 66b cumulates the data amount only for a predetermined period of time. The transfer rate register 66c stores therein the amount of transmitted media data other than the audio data per a predetermined period of time, that is, it stores the transfer rate. If the predetermined time period is set shorter, the packet transmitter 66 can resolve the transfer rate variation well and control the audio data sampling frequency with high resolution.

The band monitor 64 (FIG. 4) is invoked after the transfer rate value is stored in the transfer rate register 66c.

In step SD3, the packet transmitter 66 resets the bit counter 66b, and then the processing is completed. The bit counter 66b starts to count the data amount value of the media data other than the audio data after the processing is finished. The packet transmitter executes the above described process sequence repeatedly at predetermined intervals.

Figure 13:
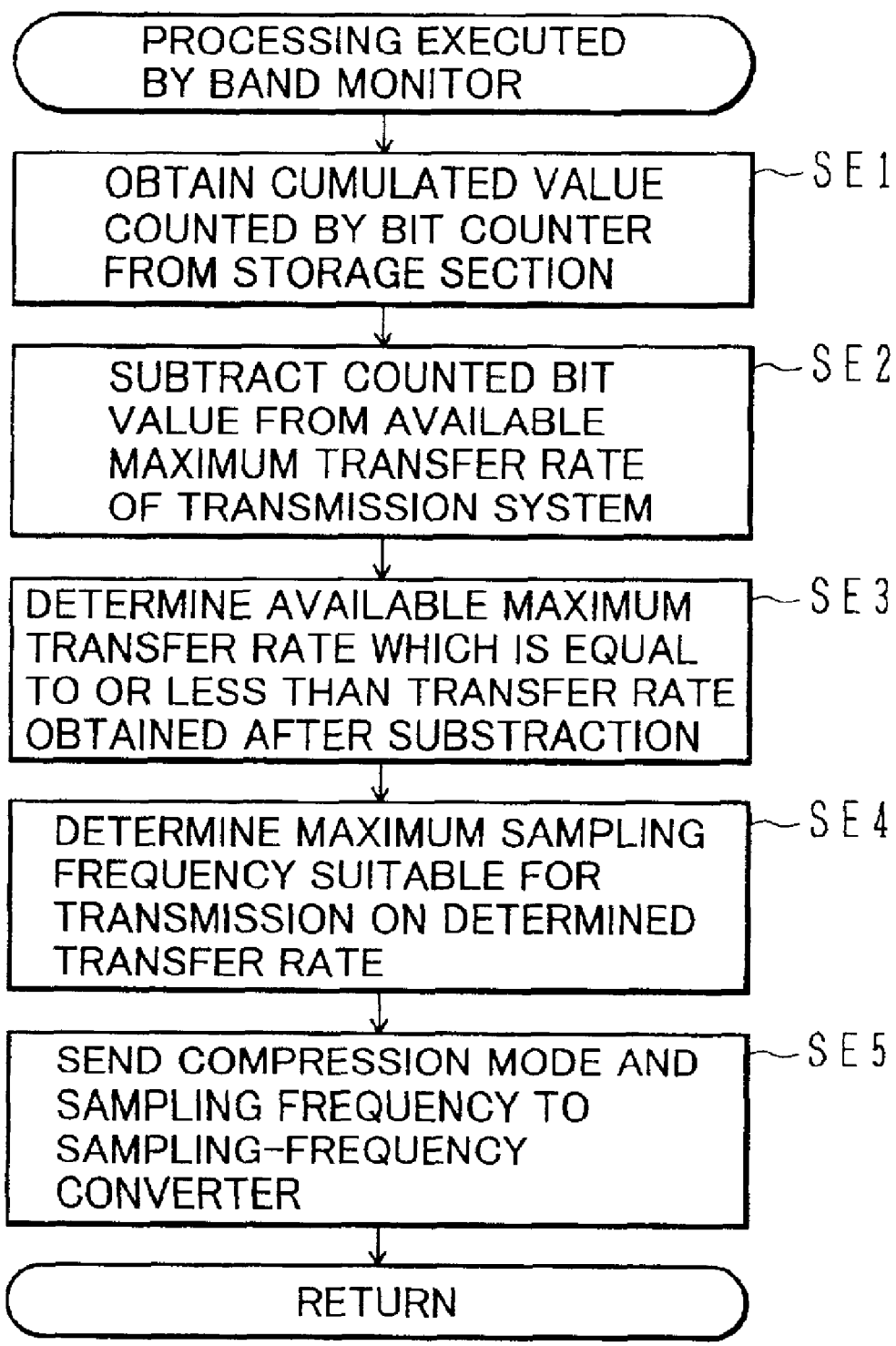
FIG. 13 is a flowchart showing process sequence executed by a band monitor in the encoder.

FIG. 13 is a flowchart showing process sequence executed by the band monitor 64 (FIG. 4). It is preferred that this process sequence is executed periodically while being synchronous with the second process sequence executed by the packet transmitter (FIG. 12).

In step SE1, the band monitor 64 obtains the cumulated value (transfer rate) counted by the bit counter 66b from the transfer rate register 66c.

In step SE2, the band monitor 64 subtracts the obtained transfer rate from allowable transfer rate limit of the encoder having the communication interface (transmission system). A value after the subtraction is the most suitable transfer rate for the audio data.

In step SE3, the band monitor 64 determines a value which is an available maximum value for the transmission system but is equal to or less than the transfer rate value after the subtraction. Usually, the transmission system has sets of available transfer rate, that is, the available transfer rate is not a continuous value. And those sets are determined (limited) in accordance with the communication interface type.

In step SE4, the band monitor 64 determines a maximum sampling frequency value from a range of the sampling frequencies which are suitable for the transmission on the determined transfer rate. It is preferable that the sampling-frequency converter 62 (FIG. 4) carries out a simple sampling frequency conversion so that a ratio of the pre-converted frequency to the converted frequency is indicated by an integer ratio, because the sampling-frequency converter 62 thins out the data to convert the sampling frequency. Therefore, the band monitor 64 determines in this step a sampling frequency value which is suitable for the sampling frequency conversion carried out by the sampling-frequency converter 62. Not only the sampling frequency, also the compression mode is determined based on the determined transfer rate.

In step SE5, the band monitor 64 sends the determined sampling frequency and the compression mode to the sampling-frequency converter 62, and then the band monitor's processing is completed.

Figure 14:
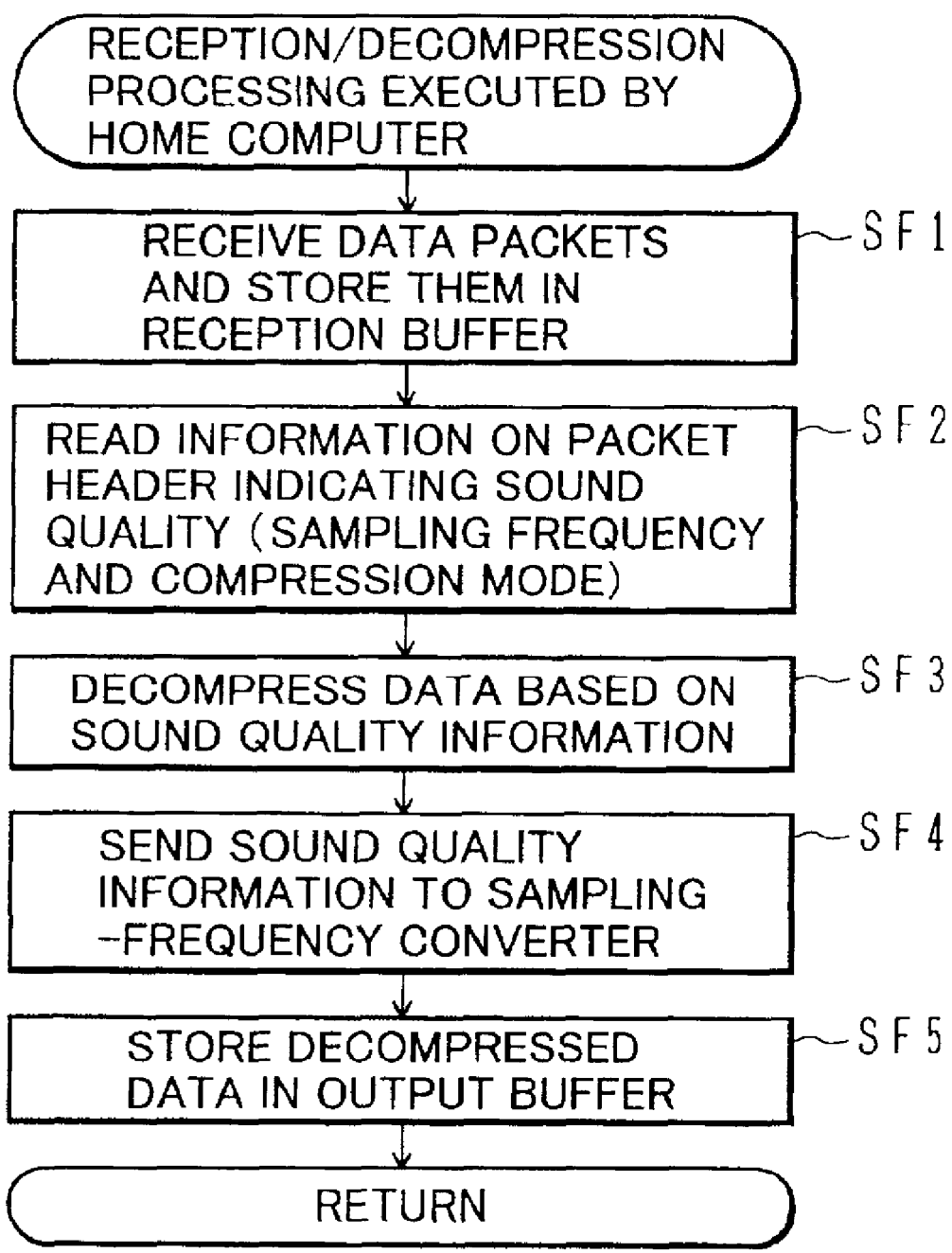
FIG. 14 is a flowchart showing process sequence executed by a decompressor in the home computer.
Figure 15:
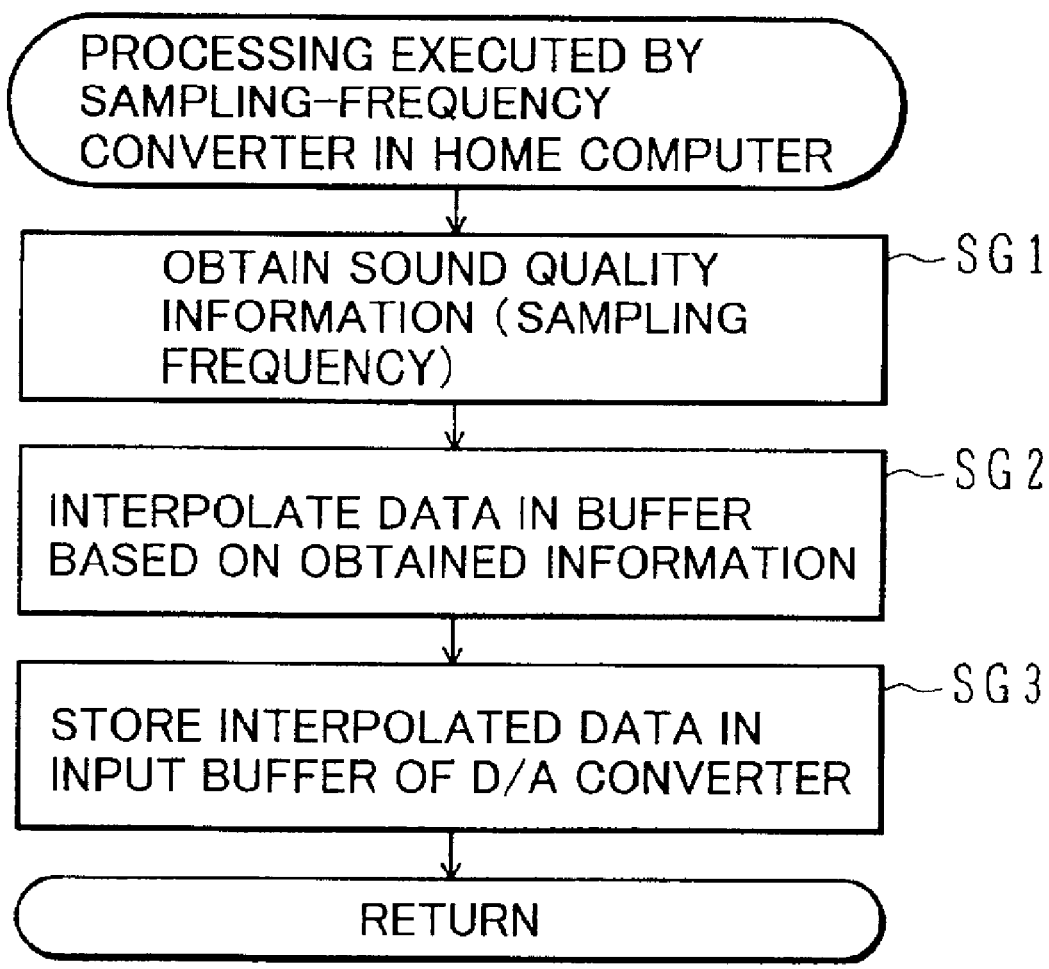
FIG. 15 is a flowchart showing process sequence executed by a sampling-frequency converter in the home computer.

FIGS. 14 and 15 are flowcharts showing process sequences executed by the home computer 9.

FIG. 14 is a flowchart showing process sequence executed by the decompressor 71 (FIG. 5) in the home computer.

In step SF1, the decompressor 71 receives the data packets and stores the received data in the reception buffer 71a packet by packet.

In step SF2, the decompressor 71 reads the information on the packet header indicating the sound quality (the sampling frequency and the compression mode).

In step SF3, the decompressor 71 decompresses the data based on the read sound quality information.

In step SF4, the decompressor 71 sends the sound quality information to the sampling-frequency converter 72 (FIG. 5)

In step SF5, the decompressor 71 stores the decompressed data in the output buffer 71b (FIG. 5). The stored data in the output buffer 71b is sequentially output to the sampling-frequency converter 72, and then the decompressor's processing is completed.

FIG. 15 is a flowchart showing process sequence executed by the sampling-frequency converter 72 (FIG. 5) in the home computer.

In step SG1, the sampling-frequency converter 72 reads the information on the packet header indicating the sound quality.

In step SG2, the sampling-frequency converter 72 interpolates the audio data in the buffer based on the read sound quality information corresponding to the audio data concerned. More precisely, the sampling-frequency converter 72 interpolates the audio data based on the sampling frequency indicated by the sound quality information. Thus, the sampling-frequency converter 72 equalizes the sampling frequencies of the audio data in the packets.

In step SG3, the sampling-frequency converter 72 stores the interpolated audio data into the input buffer 73a in the D/A converter. In this case, the performed interpolation is, for example, the linear interpolation. And then the sampling-frequency converter's processing is completed.

After the process sequence executed by the sampling-frequency converter 72 is finished, the D/A converter 73 converts the data in the buffer into analog audio data on a predetermined frequency, and sends the analog audio data to the audio output device 11. The audio output device 11 reproduces the audio data and sounds tones.

As described in the above, the transfer rate of the media data including, for example, the MIDI data and the image data, other than the audio data varies as time lapses. When the transfer rate of the media data other than the audio data is relatively high, the transfer rate of the audio data is set to the standard transfer rate. On the contrary, when the transfer rate of the media data other than the audio data is relatively low, the transfer rate of the audio data is set higher than the standard transfer rate. Thus, the sound quality of the audio data is improved. Moreover, since the transfer rate of the audio data is controlled dynamically, the transfer efficiency (network occupation rate) is also improved.

In a case, for example, of an ensemble by the electronic keyboard instrument and the non-electronic piano, the electronic keyboard instrument generates the MIDI data and the non-electronic piano generates the audio data. It is controllable so that the MIDI data generation is stopped during the piano solo. In such a situation, the sampling frequency of the audio data is gained to reproduce the audio data of the non-electronic piano with high sound quality.

The embodiment is not limited to a case for communicating the audio data or MIDI data through the internet. For example, the embodiment may be employed in other communications such as IEEE1394 standardized digital serial communications and satellite communications.

The present invention has been explained referring to the embodiment. However, the present invention is not limited to the embodiment, and various modifications, improvements, combinations, etc. are possible, as should be apparent to those skilled in the art.

What is claimed is:

1. A communication device comprising:
   an input device that inputs digital audio data and media data other than the digital audio data to said communication device;
   a transfer rate estimator which estimates transfer rate of the media data other than the digital audio data before transmission in accordance with a communication rate of a communication network;
   a data amount controller which controls the amount of the digital audio data to be transmitted in accordance with the transfer rate estimated by said transfer rate estimator; and
   a transmitter which transmits the digital audio data whose data amount is controlled by said data amount controller, the media data other than the digital audio data, and data amount information indicating data amount of the digital audio data controlled by said data amount controller.

2. The communication device according to claim 1, wherein said data amount controller thins out the digital audio data to control its data amount.

3. The communication device according to claim 1, wherein the media data other than the digital audio includes MIDI data.

4. A communication method comprising the steps of:
   (a) inputting digital audio data and media data other than the digital audio data
   (b) estimating transfer rate of the media data other than the digital audio data before transmission in accordance with a communication rate of a communication network;
   (c) controlling data amount of the digital audio data to be transmitted in accordance with the estimated transfer rate; and
   (d) transmitting the digital audio data whose data amount is controlled by said step (c), the media data other than the digital audio data, and data amount information indicating data amount of the digital audio data controlled by said step (c).

5. The communication method according to claim 4, wherein said step (c) thins out the digital audio data to control its data amount.

6. The communication method according to claim 4, wherein the media data other than the digital audio data includes MIDI data.

7. A recording medium storing a program which causes a computer to execute the steps of:
   (a) inputting digital audio data and media data other than the digital audio data;
   (b) estimating transfer rate of the media data other than the digital audio data before transmission in accordance with a communication rate of a communication network;
   (c) controlling data amount of the digital audio data to be transmitted in accordance with the estimated transfer rate; and
   (d) transmitting the digital audio data whose data amount is controlled by said step (c), the media data other than the digital audio data, and data amount information indicating data amount of the digital audio data controlled by said step (c).

8. The recording medium storing the program according to claim 7, wherein said step (d) transmits data amount information indicating whether the amount of the data is controlled by said step (c), together with the digital audio data.

9. The recording medium storing the program according to claim 7, wherein said step (c) thins out the digital audio data to control its data amount.

10. The recording medium storing the program according to claim 7, wherein the media data other than the digital audio data includes MIDI data.

11. A communication device comprising:

inputting means for inputting digital audio data and media data other than the digital audio data;

transfer rate estimation means for estimating transfer rate of the media data other than the digital audio data before transmission in accordance with a communication rate of a communication network;

data amount controlling means for controlling data amount of the digital audio data to be transmitted in accordance with the transfer rate estimated by said transfer rate estimating means; and transmission means for transmitting the digital audio data whose data amount is controlled by said data amount controlling means, the media data other than the digital audio data, and data amount information indicating data amount of the digital audio data controlled by said data amount controlling means.

\* \* \* \* \*